(12) United States Patent
Anderson et al.

(10) Patent No.: US 9,453,971 B2
(45) Date of Patent: Sep. 27, 2016

(54) MANAGED FIBER CONNECTIVITY SYSTEMS

(71) Applicants: ADC Telecommunications, Inc., Berwyn, PA (US); Tyco Electronics UK Ltd, Swindon, Wilshire (GB)

(72) Inventors: David J. Anderson, Bloomington, MN (US); Stephen Lambourn, Swindon (GB)

(73) Assignees: CommScope Technologies LLC, Hickory, NC (US); CommScope Connectivity UK Limited (GB)

( * ) Notice: Subject to any disclaimer, the term of this patent is extended or adjusted under 35 U.S.C. 154(b) by 30 days.

(21) Appl. No.: 13/939,826

(22) Filed: Jul. 11, 2013

(65) Prior Publication Data

US 2014/0023326 A1   Jan. 23, 2014

Related U.S. Application Data

(60) Provisional application No. 61/670,366, filed on Jul. 11, 2012.

(51) Int. Cl.
   *G02B 6/38* (2006.01)
(52) U.S. Cl.
   CPC ............. *G02B 6/381* (2013.01); *G02B 6/3895* (2013.01)
(58) Field of Classification Search
   CPC ............................. G02B 6/381; G02B 6/3895
   USPC ...................................................... 385/77, 78
   See application file for complete search history.

(56) References Cited

U.S. PATENT DOCUMENTS

| RE26,692 E | 10/1969 | Ruehlemann |
| 3,954,320 A | 5/1976 | Hardesty |
| 4,737,120 A | 4/1988 | Grabbe et al. |
| 4,953,194 A | 8/1990 | Hansen et al. |
| 4,968,929 A | 11/1990 | Hauck et al. |
| 5,041,005 A | 8/1991 | McHugh |

(Continued)

FOREIGN PATENT DOCUMENTS

| DE | 102 44 304 | 3/2004 |
| DE | 10 2004 033 940 A1 | 2/2006 |

(Continued)

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

(Continued)

*Primary Examiner* — Peter Radkowski
(74) *Attorney, Agent, or Firm* — Merchant & Gould P.C.

(57) ABSTRACT

A communications connection system includes an SC fiber optic connector including a storage device having memory configured to store physical layer information. The storage device also includes electrical contacts or an RFID antenna coil connected to the memory for transmitting information to a management system. The communications connection system also includes a fiber optic adapter module having one or more media reading interfaces. Each media reading interface is configured to read physical layer information stored on one of the fiber optic connectors received at the adapter module. Example media reading interfaces include electrical contacts and RFID readers.

17 Claims, 16 Drawing Sheets

(56) References Cited

U.S. PATENT DOCUMENTS

| | | | |
|---|---|---|---|
| 5,052,940 A | 10/1991 | Bengal | |
| 5,064,381 A | 11/1991 | Lin | |
| 5,161,988 A | 11/1992 | Krupka | |
| 5,199,895 A | 4/1993 | Chang | |
| 5,222,164 A | 6/1993 | Bass, Sr. et al. | |
| 5,305,405 A | 4/1994 | Emmons et al. | |
| 5,317,663 A | 5/1994 | Beard et al. | |
| 5,393,249 A | 2/1995 | Morgenstern et al. | |
| 5,394,503 A | 2/1995 | Dietz, Jr. et al. | |
| 5,413,494 A | 5/1995 | Dewey et al. | |
| 5,419,717 A | 5/1995 | Abendschein et al. | |
| 5,467,062 A | 11/1995 | Burroughs | |
| 5,483,467 A | 1/1996 | Krupka et al. | |
| 5,579,425 A | 11/1996 | Lampert et al. | |
| 5,685,741 A | 11/1997 | Dewey et al. | |
| 5,821,510 A | 10/1998 | Cohen et al. | |
| 5,910,776 A * | 6/1999 | Black | 340/10.1 |
| 6,002,331 A | 12/1999 | Laor | |
| 6,116,961 A | 9/2000 | Henneberger et al. | |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,300,877 B1 | 10/2001 | Schannach et al. | |
| 6,330,307 B1 | 12/2001 | Bloch et al. | |
| 6,350,148 B1 | 2/2002 | Bartolutti et al. | |
| 6,409,392 B1 | 6/2002 | Lampert et al. | |
| 6,424,710 B1 | 7/2002 | Bartolutti et al. | |
| 6,437,894 B1 | 8/2002 | Gilbert et al. | |
| 6,456,768 B1 | 9/2002 | Boncek et al. | |
| 6,499,861 B1 | 12/2002 | German et al. | |
| 6,511,231 B2 | 1/2003 | Lampert et al. | |
| 6,522,737 B1 | 2/2003 | Bartolutti et al. | |
| 6,574,586 B1 | 6/2003 | David et al. | |
| 6,636,152 B2 | 10/2003 | Schannach et al. | |
| 6,725,177 B2 | 4/2004 | David et al. | |
| 6,743,044 B2 | 6/2004 | Musolf et al. | |
| 6,802,735 B2 | 10/2004 | Pepe et al. | |
| 6,808,116 B1 * | 10/2004 | Eslambolchi et al. | 235/492 |
| 6,898,368 B2 | 5/2005 | Colombo et al. | |
| 6,905,363 B2 | 6/2005 | Musolf et al. | |
| 6,932,517 B2 | 8/2005 | Swayze et al. | |
| 6,971,895 B2 * | 12/2005 | Sago et al. | 439/188 |
| 7,081,808 B2 | 7/2006 | Colombo et al. | |
| 7,088,880 B1 | 8/2006 | Gershman | |
| 7,123,810 B2 | 10/2006 | Parrish | |
| 7,153,142 B2 | 12/2006 | Shifris et al. | |
| 7,165,728 B2 * | 1/2007 | Durrant et al. | 235/492 |
| 7,193,422 B2 | 3/2007 | Velleca et al. | |
| 7,210,858 B2 * | 5/2007 | Sago et al | 385/88 |
| 7,226,217 B1 | 6/2007 | Benton et al. | |
| 7,234,944 B2 | 6/2007 | Nordin et al. | |
| 7,297,018 B2 | 11/2007 | Caveney et al. | |
| 7,315,224 B2 | 1/2008 | Gurovich et al. | |
| 7,352,289 B1 | 4/2008 | Harris | |
| 7,356,208 B2 | 4/2008 | Becker | |
| 7,374,101 B2 * | 5/2008 | Kaneko | 235/492 |
| 7,427,165 B2 * | 9/2008 | Benaron et al. | 385/75 |
| 7,458,517 B2 | 12/2008 | Durrant et al. | |
| 7,519,000 B2 | 4/2009 | Caveney et al. | |
| 7,552,872 B2 | 6/2009 | Tokita et al. | |
| 7,869,426 B2 | 1/2011 | Hough et al. | |
| 7,872,738 B2 | 1/2011 | Abbott | |
| 2002/0081076 A1 | 6/2002 | Lampert et al. | |
| 2004/0052471 A1 | 3/2004 | Colombo et al. | |
| 2004/0117515 A1 * | 6/2004 | Sago et al. | 710/1 |
| 2004/0120657 A1 * | 6/2004 | Sago et al. | 385/88 |
| 2004/0240807 A1 | 12/2004 | Frohlich et al. | |
| 2005/0215119 A1 * | 9/2005 | Kaneko | 439/607 |
| 2005/0249477 A1 | 11/2005 | Parrish | |
| 2006/0098921 A1 * | 5/2006 | Benaron et al. | 385/75 |
| 2006/0160395 A1 | 7/2006 | Macauley et al. | |
| 2006/0193591 A1 | 8/2006 | Rapp et al. | |
| 2006/0228086 A1 | 10/2006 | Holmberg et al. | |
| 2007/0116411 A1 | 5/2007 | Benton et al. | |
| 2007/0237470 A1 | 10/2007 | Aronson et al. | |
| 2008/0090450 A1 | 4/2008 | Harano et al. | |
| 2008/0100456 A1 * | 5/2008 | Downie et al. | 340/572.8 |
| 2008/0100467 A1 * | 5/2008 | Downie et al. | 340/686.2 |
| 2008/0172722 A1 * | 7/2008 | Fujita et al. | 726/4 |
| 2008/0175532 A1 * | 7/2008 | Ruckstuhl et al. | 385/16 |
| 2008/0175550 A1 | 7/2008 | Coburn et al. | |
| 2008/0220721 A1 * | 9/2008 | Downie et al. | 455/41.3 |
| 2008/0310795 A1 | 12/2008 | Parkman, III et al. | |
| 2009/0034911 A1 | 2/2009 | Murano | |
| 2009/0060422 A1 | 3/2009 | Lin et al. | |
| 2009/0220248 A1 | 9/2009 | Hudgins | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0303421 A1 | 12/2010 | He et al. | |
| 2011/0222819 A1 | 9/2011 | Anderson et al. | |
| 2011/0235979 A1 | 9/2011 | Anderson et al. | |
| 2011/0255829 A1 | 10/2011 | Anderson et al. | |
| 2011/0262077 A1 | 10/2011 | Anderson et al. | |
| 2012/0141074 A1 | 6/2012 | Sabo | |
| 2012/0208401 A1 * | 8/2012 | Petersen | 439/620.22 |
| 2012/0294572 A1 | 11/2012 | Petersen | |

FOREIGN PATENT DOCUMENTS

| | | | | |
|---|---|---|---|---|
| EP | 473063 A2 * | 3/1992 | | H01R 13/658 |
| EP | 1 199 586 A2 | 4/2002 | | |
| EP | 1 237 024 A1 | 9/2002 | | |
| EP | 1 467 232 A1 | 10/2004 | | |
| EP | 1 662 287 A1 | 5/2006 | | |
| JP | 2005-303809 | 10/2005 | | |
| WO | WO 9853421 A1 * | 11/1998 | | G06K 7/00 |
| WO | WO 2007/061490 A2 | 5/2007 | | |
| WO | WO 2010/001400 A1 | 1/2010 | | |
| WO | WO 2010/121639 A1 | 10/2010 | | |

OTHER PUBLICATIONS

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT ©2003 (6 pages).

International Search Report and Written Opinion mailed May 23, 2011 in related Application No. PCT/US2011/024650 (17 pages).

International Search Report and Written Opinion mailed Sep. 12, 2011 in related Application No. PCT/US2011/024652 (28 pages).

International Search Report and Written Opinion mailed Sep. 19, 2011 in related Application No. PCT/US2011/024649 (27 pages).

International Search Report and Written Opinion mailed Sep. 22, 2011 in related Application No. PCT/US2011/024653 (25 pages).

International Search Report and Written Opinion for PCT/US2012/033578 mailed Nov. 28, 2012.

International Search Report and Written Opinion for PCT/US2013/050103 mailed Oct. 24, 2013.

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

Partial International Search and Invitation to Pay Additional Fees mailed May 19, 2011 in related Application No. PCT/US2011/024653 (6 pages).

Partial International Search and Invitation to Pay Additional Fees mailed Jun. 8, 2011 in related Application No. PCT/US2011/024649 (8 pages).

(56) References Cited

OTHER PUBLICATIONS

Partial International Search and Invitation to Pay Additional Fees mailed Jun. 16, 2011 in related Application No. PCT/US2011/024652 (9 pages).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
Machine Translation (6 pages) of WO 9853421, which published Nov. 26, 1998.

* cited by examiner

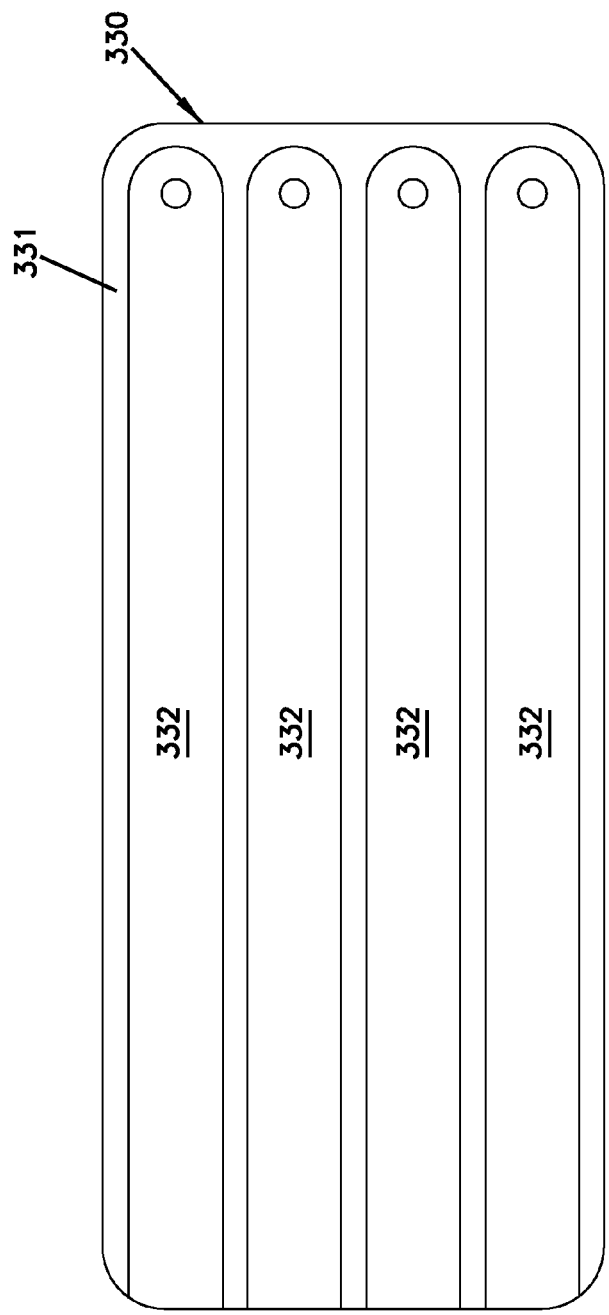
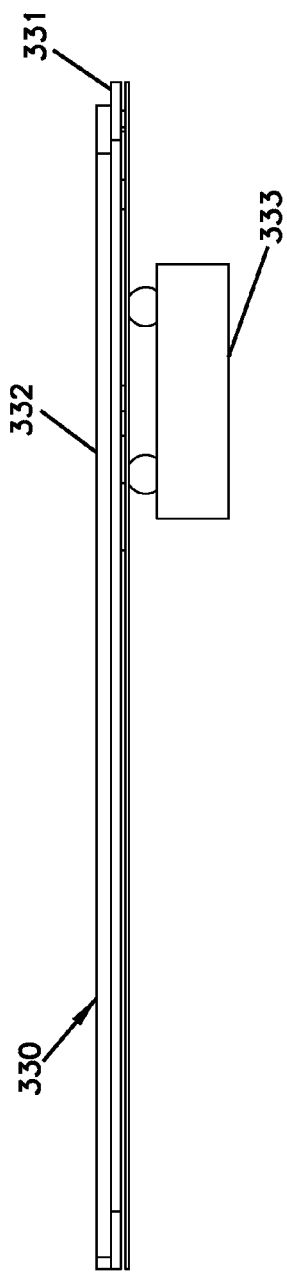
FIG. 7
FIG. 8

MANAGED FIBER CONNECTIVITY SYSTEMS

CROSS-REFERENCE TO RELATED APPLICATION

The present patent application claims the benefit of U.S. Provisional Patent Application Ser. No. 61/670,366, filed Jul. 11, 2012, which application is hereby incorporated by reference in its entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in a limited space.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to optical adapters and optical connectors that provide physical layer management capabilities. In accordance with certain aspects, the disclosure relates to SC-type optical adapters and SC-type optical connectors.

In some implementations, a fiber optic connector includes an inner body, an outer body, and a storage device. The inner body is configured to retain a ferrule that extends longitudinally through the inner body. The inner body defines a recess that extends longitudinally along an exterior surface of the inner body. The outer body slideably received about the inner body. The outer body defines a cut-out extending rearwardly from a front of the outer body. The cut-out is aligned with the recess defined in the inner body. The storage device is disposed in the recess of the inner body. At least a portion of the storage device extends from the recess at least partially through the cut-out of the outer body. The storage device includes memory configured to store physical layer information. The storage device also includes at least one contact member that is electrically connected to the memory.

In certain implementations, a front edge of the storage device is disposed flush with a front edge of the inner body. In other implementations, a front edge of the storage device is disposed rearwardly offset with a front edge of the inner body.

A fiber optic adapter module includes a housing, a cover, and a media reading interface. The housing defines at least one passageway extending between the front and the rear to define first and second ports. The housing is configured to retain a fiber optic connector at each port. The housing also defines at least a first opening leading through a first end wall to the passageway. The cover is configured to couple to the housing at the first end to cover the first opening. The cover and the housing cooperate to define an end wall at the first end of the housing. The cover defines a majority of the end wall. The cover defines at least one slot that extends along a central axis of the cover. The slot also extends through the cover to provide access between the passageway and an exterior of the housing when the cover is mounted to the housing. The first media reading interface is positioned in the cover and has at least a first contact location and a second contact location. The first media reading interface is configured so that the second contact location is accessible from within the passageway and the first contact locations is accessible through the slot from the exterior of the housing when the cover is coupled to the housing.

In accordance with other aspects, a cover arrangement for mounting to an optical adapter includes a cover body and at least a first contact member of a first media reading interface. The cover body defines at least a first slot that extends in a forward-rearward direction along a central longitudinal axis of the cover body. The first slot extends through two planar surfaces of the cover. The first contact member of the first media reading interface is disposed in the first slot. The first contact member has a first moveable section and a second moveable section. The first moveable section is configured to extend through the first slot past a first of the planar surfaces. The second moveable section is configured to extend through the first slot past a second of the planar surfaces.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a top plan view of an example storage device suitable for mounting to any of the optical connectors disclosed herein;

FIG. 8 is a side elevational view of the storage device of FIG. 7;

DETAILED DESCRIPTION

Figure 1:
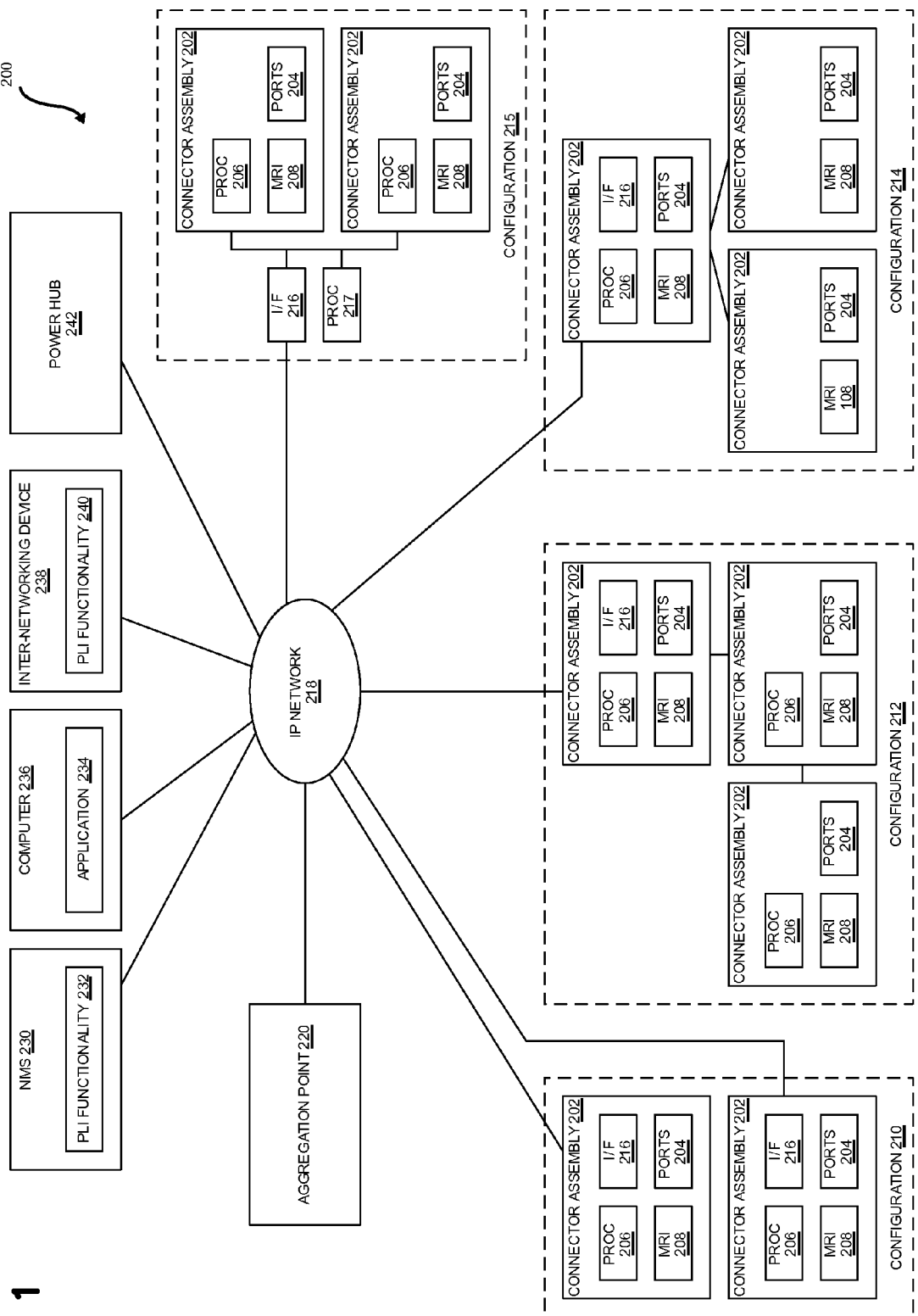
FIG. 1 is a block diagram of one embodiment of a communications management system that includes PLI functionality as well as PLM functionality in accordance with aspects of the present disclosure.

Reference will now be made in detail to exemplary aspects of the present disclosure that are illustrated in the accompanying drawings. Wherever possible, the same reference numbers will be used throughout the drawings to refer to the same or like parts.

Reference will now be made in detail to exemplary aspects of the present disclosure that are illustrated in the accompanying drawings. Wherever possible, the same reference numbers will be used throughout the drawings to refer to the same or like parts.

In accordance with some aspects of the disclosure, an example communications and data management system includes at least part of a communications network along which communications signals pass. Media segments connect equipment of the communications network. Non-limiting examples of media segments include optical cables, electrical cables, and hybrid cables. This disclosure will focus on optical media segments. The media segments may be terminated with optical plug connectors, media converters, or other optical termination components.

In accordance with aspects of the disclosure, the communications and data management system provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system. Physical layer information of the communications system can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

FIG. 1 is a block diagram of one example implementation of a communications management system 200 that includes PLI functionality as well as PLM functionality. The management system 200 comprises a plurality of connector assemblies 202 (e.g., patch panels, blades, optical adapters, electrical jacks, media converters, transceivers, etc.), connected to an IP network 218. Each connector assembly 202 includes one or more ports 204, each of which is configured to receive a media segment for connection to other media segments or equipment of the management system 200. For the purposes of this disclosure, optical connector assemblies 202 and optical media segments will be described. In other implementations, however, electrical connector assemblies and media segments may be used.

At least some of the connector assemblies 202 are designed for use with optical cables that have physical layer information stored in or on them. The physical layer information is configured to be read by a programmable processor 206 associated with one or more connector assemblies 202. In general, the programmable processor 206 communicates with memory of an optical cable using a media reading interface 208. In some implementations, each of the ports 204 of the connector assemblies 202 includes a respective media reading interface 208. In other implementations, a single media reading interface 208 may correspond to two or more ports 204.

In FIG. 1, four example types of connector assembly configurations 210, 212, 214, and 215 are shown. In the first connector assembly configuration 210, each connector assembly 202 includes its own respective programmable processor 206 and its own respective network interface 216 that is used to communicatively couple that connector assembly 202 to an Internet Protocol (IP) network 218. In the second type of connector assembly configuration 212, connector assemblies 202 are grouped together in proximity to each other (e.g., in a rack, rack system, patch panel, chassis, or equipment closet). Each connector assembly 202 of the group includes its own respective programmable processor 206. However, not all of the connector assemblies 202 include their own respective network interfaces 216.

In the third type of connector assembly configuration 214, some of the connector assemblies 202 (e.g., "masters") in the group include their own programmable processors 206 and network interfaces 216, while others of the connector assemblies 202 (e.g., slaves") do not include their own programmable processors 206 or network interfaces 216. Each programmable processor 206 is able to carry out the PLM functions for both the connector assembly 202 of which it is a part and any of the slave connector assemblies 202 to which the master connector assembly 202 is connected via the local connections.

In the fourth type of connector assembly configuration 215, each of the connector assemblies 202 in a group includes its own "slave" programmable processors 206. Each slave programmable processor 206 is configured to manage the media reading interfaces 208 to determine if physical communication media segments are attached to the port 204 and to read the physical layer information stored in or on the attached physical communication media segments (if the attached segments have such information stored therein or thereon). Each of the slave programmable processors 206 in the group also is communicatively coupled to a common "master" programmable processor 217. The master processor 217 communicates the physical layer information read from by the slave processors 206 to devices that are coupled to the IP network 218. For example, the master programmable processor 217 may be coupled to a network interface 216 that couples the master processor 217 to the IP network 218.

In accordance with some aspects, the communications management system 200 includes functionality that enables the physical layer information captured by the connector assemblies 202 to be used by application-layer functionality outside of the traditional physical-layer management application domain. For example, the management system 200 may include an aggregation point 220 that is communicatively coupled to the connector assemblies 202 via the IP network 218. The aggregation point 220 can be implemented on a standalone network node or can be integrated along with other network functionality.

The aggregation point 220 includes functionality that obtains physical layer information from the connector assemblies 202 (and other devices) and stores the physical layer information in a data store. The aggregation point 220 also can be used to obtain other types of physical layer information. For example, this information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The management system 200 also may include a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. In certain implementations, the NMS 230 communicates with the aggregation point 220 over the IP network 218. In other implementations, the NMS 230 may be directly connected to the aggregation point 220.

An application 234 executing on a computer 236 also can use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218.

One or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

Additional details pertaining to example communications management system 200 can be found in U.S. application Ser. No. 13/025,841, filed Feb. 11, 2011, and titled "Managed Fiber Connectivity Systems," the disclosure of which is hereby incorporated herein by reference.

Figure 2:
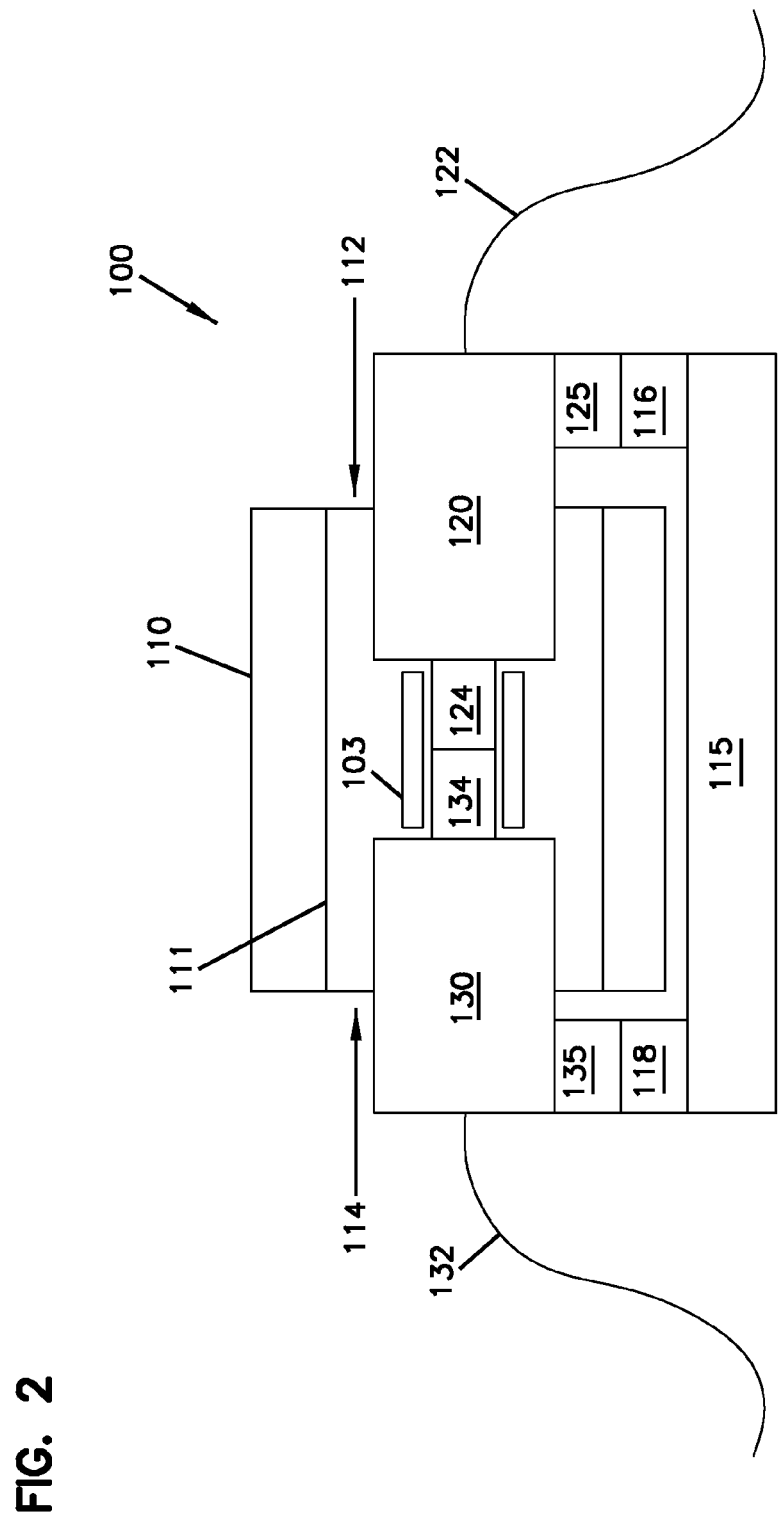
FIG. 2 is a block diagram of one high-level example of a coupler assembly and media reading interface that are suitable for use in the management system of FIG. 1 in accordance with aspects of the present disclosure.

FIG. 2 is a schematic diagram of one example connector assembly 110 configured to collect physical layer information from a connector arrangement 120 terminating a media segment 122. The example connector assembly 120 of FIG. 2 is configured to connect segments of optical physical communications media in a physical layer management system. The connector assembly 110 includes a fiber optic adapter defining at least one connection opening 111 having a first port end 112 and a second port end 114. A sleeve (e.g., a split sleeve) 103 is arranged within the connection opening 111 of the adapter 110 between the first and second port ends 112, 114. Each port end 112, 114 is configured to receive a connector arrangement as will be described in more detail herein.

A first example segment of optical physical communication media includes a first optical fiber 122 terminated by a first connector arrangement 120. A second example segment of optical physical communication media includes a second optical fiber 132 terminated by a second connector arrangement 130. The first connector arrangement 120 is plugged into the first port end 112 and the second connector arrangement 130 is plugged into the second port end 114. Each fiber connector arrangement 120, 130 includes a ferrule 124, 134 through which optical signals from the optical fiber 122, 132, respectively, pass.

The ferrules 124, 134 of the connector arrangements 120, 130 are aligned by the sleeve 103 when the connector arrangements 120, 130 are inserted into the connection opening 111 of the adapter 110. Aligning the ferrules 124, 134 provides optical coupling between the optical fibers 122, 132. In some implementations, each segment of optical physical communication media (e.g., each optical fiber 122, 132) carries communication signals. The aligned ferrules 124, 134 of the connector arrangements 120, 130 create an optical path along which the communication signals may be carried.

In some implementations, the first connector arrangement 120 may include a storage device 125 that is configured to store physical layer information (e.g., an identifier and/or attribute information) pertaining to the segment of physical communications media (e.g., the first connector arrangement 120 and/or the fiber optic cable 122 terminated thereby). In some implementations, the connector arrangement 130 also includes a storage device 135 that is configured to store information (e.g., an identifier and/or attribute information) pertaining to the second connector arrangement 130 and/or the second optic cable 132 terminated thereby.

In one implementation, each of the storage devices 125, 135 is implemented using an EEPROM (e.g., a PCB surface-mount EEPROM). In other implementations, the storage devices 125, 135 are implemented using other non-volatile memory device. Each storage device 125, 135 is arranged and configured so that it does not interfere or interact with the communications signals communicated over the media segments 122, 132.

In accordance with some aspects, the adapter 110 is coupled to at least a first media reading interface 116. In certain implementations, the adapter 110 also is coupled to at least a second media interface 118. In some implementations, the adapter 110 is coupled to multiple media reading interfaces. In certain implementations, the adapter 110 includes a media reading interface for each port end defined by the adapter 110. In other implementations, the adapter 110 includes a media reading interface for each connection opening 111 defined by the adapter 110. In still other implementations, the adapter 110 includes a media reading interface for each connector arrangement that the adapter 110 is configured to receive. In still other implementations, the adapter 110 includes a media reading interface for only a portion of the connector arrangement that the adapter 110 is configured to receive.

In some implementations, at least the first media reading interface 116 is mounted to a printed circuit board 115. In the example shown, the first media reading interface 116 of the printed circuit board 115 is associated with the first port end 112 of the adapter 110. In some implementations, the printed circuit board 115 also can include the second media reading interface 118. In one such implementation, the second media reading interface 1818 is associated with the second port end 114 of the adapter 110.

The printed circuit board 115 of the connector assembly 110 can be communicatively connected to one or more programmable processors (e.g., processors 216 of FIG. 1) and/or to one or more network interfaces (e.g., network interfaces 216 of FIG. 1). The network interface may be configured to send the physical layer information to a physical layer management network (e.g., see IP network 218 of FIG. 1). In one implementation, one or more such processors and interfaces can be arranged as components on the printed circuit board 115. In another implementation, one or more such processor and interfaces can be arranged on separate circuit boards that are coupled together. For example, the printed circuit board 115 can couple to other circuit boards via a card edge type connection, a connector-to-connector type connection, a cable connection, etc.

When the first connector arrangement 120 is received in the first port end 112 of the adapter 110, the first media reading interface 1816 is configured to enable reading (e.g., by the processor) of the information stored in the storage device 125. The information read from the first connector arrangement 120 can be transferred through the printed circuit board 115 to a physical layer management network, e.g., network 218 of FIG. 1, etc. When the second connector arrangement 130 is received in the second port end 114 of the adapter 110, the second media reading interface 118 is configured to enable reading (e.g., by the processor) of the information stored in the storage device 135. The information read from the second connector arrangement 130 can be transferred through the printed circuit board 115 or another circuit board to the physical layer management network.

In some such implementations, the storage devices 125, 135 and the media reading interfaces 116, 118 each comprise three (3) leads—a power lead, a ground lead, and a data lead. The three leads of the storage devices 125, 135 come into electrical contact with three (3) corresponding leads of the media reading interfaces 116, 118 when the corresponding media segment is inserted in the corresponding port. In certain example implementations, a two-line interface is used with a simple charge pump. In still other implementations, additional leads can be provided (e.g., for potential future applications). Accordingly, the storage devices 125, 135 and the media reading interfaces 116, 118 may each include four (4) leads, five (5) leads, six (6) leads, etc.

Figure 4:
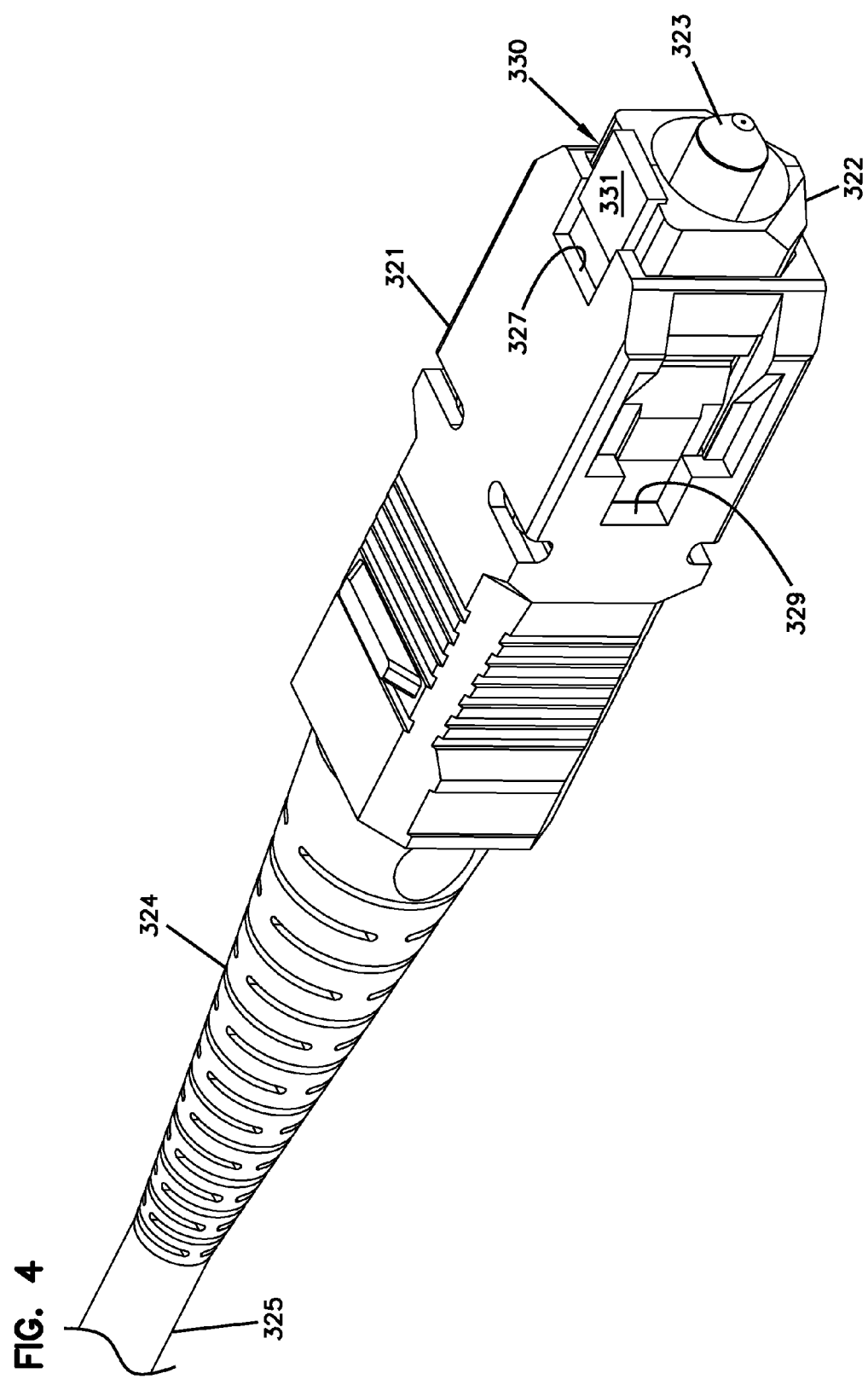
FIG. 4 is a front perspective view of an SC-type optical connector on which a storage device is flush-mounted to provide PLI and PLM functionality.
Figure 5:
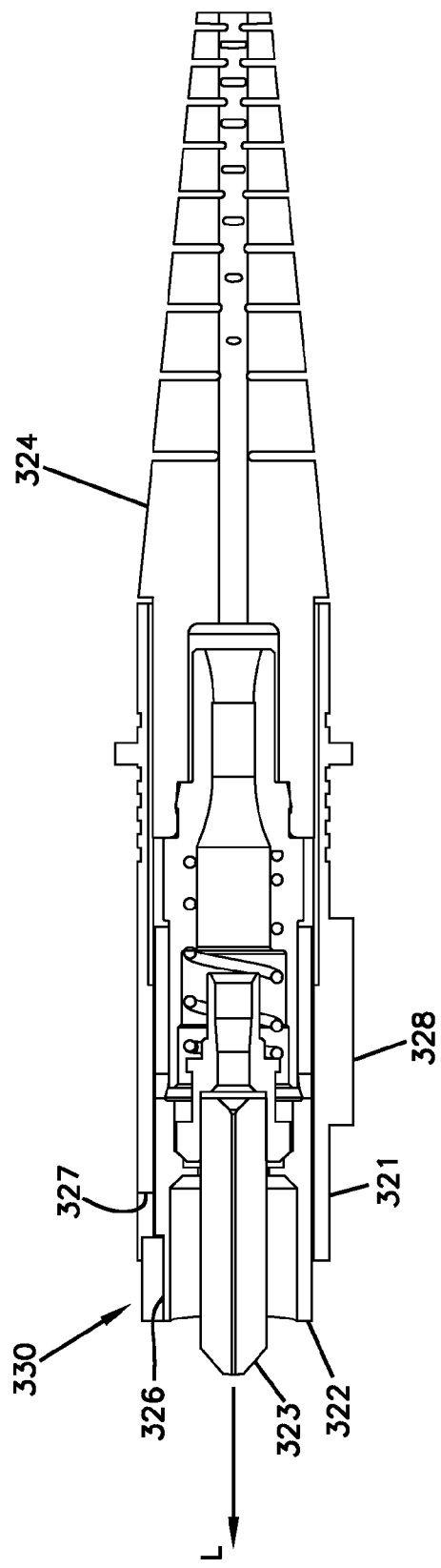
FIG. 5 is an axial cross-sectional view of the optical connector of FIG. 4.

FIGS. 4-5 illustrate an example implementation of a connector system 300 that can be utilized on a connector assembly (e.g., a communications panel) having PLI functionality as well as PLM functionality. One example connector assembly on which the connector system 300 can be implemented is a bladed chassis. Examples of bladed chassis can be found in U.S. application Ser. No. 13/025,750, filed Feb. 11, 2011, and titled "Communications Bladed Panel System," the disclosure of which is hereby incorporated herein by reference in its entirety. The connector system 300 includes at least one example communications coupler assembly 310 and at least two connector arrangements 320.

The communications coupler assembly 310 is configured to be mounted to a connector assembly, such as a communications blade or a communications panel. One or more connector arrangements 320, which each terminate at least one segment of communications media 325 (FIG. 4), are configured to communicatively couple to other segments of physical communications media at the coupler assembly 310 (e.g., see FIG. 3). Accordingly, communications data signals carried by a media segment 325 terminated by a first connector arrangement 320 can be propagated to another media segment (e.g., terminated by a second connector arrangement 320) through the communications coupler assembly 310.

In accordance with some aspects, each communications coupler assembly 310 is configured to form a single link between segments of physical communications media. For example, each communications coupler assembly 310 can define a single passage at which a first connector arrangement 320A is coupled to a second connector arrangement 320B (see FIG. 3). In accordance with other aspects, however, each communications coupler assembly 310 is configured to form two or more links between segments 325 of physical communications media.

In accordance with some aspects, each connector arrangement 320 is configured to terminate a single segment of physical communications media. For example, each connector arrangement 320 can include a single optical connector that terminate a single optical fiber 325 or a single electrical conductor. In one example implementation, each connector arrangement 320 includes a single SC-type fiber optic connector 320 that terminates a single optical fiber 325 (see FIG. 4). In other implementations, the connector 320 can be an LC-type, an ST-type, an FC-type, an LX.5-type, etc.

FIG. 4 is a front perspective view an example fiber optic connector arrangement 320 including an SC-type connector. The connector 320 includes an outer body 321 surrounding an inner body 322. The inner body 322 holds a ferrule 323, which retains an optical fiber 325. The outer body 321 is configured to move relative to the inner body 322 along a longitudinal axis L of the ferrule 323. The ferrule 323 also is configured to move within the inner body 322 against a spring bias. A boot 324 extends rearwardly from the outer connector body 321 to provide bend protection to the optical fiber 325. For example, the boot 324 may be secured between the outer body 321 and the inner body 322.

The outer housing 321 defines two slots 329 on opposite sides thereof through which raised portions of the inner housing 322 are visible. The outer housing 321 also defines a key 328 located on a side perpendicular to the sides containing the slots 329. The key 328 is configured to engage a keyway of coupler assembly 310 to properly position the connector 320 at a port of the coupler assembly 310. The outer body 321 also includes a knurled handle or other grip section at a rear of the outer body 321. In certain implementations, the grip section defines a textured surface (e.g., ridges).

Additional details regarding an example connector 320 can be found in U.S. Pat. No. 5,317,663, issued May 31, 1994 to Beard et al., and titled "One-Piece SC Adapter," the disclosure of which is hereby incorporated herein by reference in its entirety.

Each connector arrangement 320 is configured to store physical layer information. For example, a storage device 330 (FIGS. 7 and 8) may be installed on or in the fiber optic connector 320. One example storage device 330 includes a printed circuit board 331 on which memory circuitry can be arranged. Electrical contacts 332 also may be arranged on the printed circuit board 331 for interaction with a media reading interface of the communications coupler assembly 310 (described in more detail herein). In one example implementation, the storage device 330 includes an EEPROM circuit 333 arranged on the printed circuit board 331. In other implementations, however, the storage device 330 can include any suitable type of non-volatile memory.

The storage device 330 shown in FIGS. 7 and 8 includes generally planar contacts 332 positioned on a generally planar circuit board 331. In the example shown, the contacts extend over an elongated dimension of the board 331. In other implementations, however, the board 331 may have a square geometry or the contacts may be otherwise arranged on the board. Memory 333 (FIG. 8) of the storage device 330, which is located on the non-visible side of the board in FIGS. 4 and 7, is accessed by engaging the tops of the contacts 332 with one or more electrically conductive contact members of a media reading interface (e.g., media reading interface 116 of FIG. 2). In certain implementations, the contact member slides or wipes across the memory contacts 332.

In some implementations, the contacts 332 have the same length. In other implementations, one or more of the contacts 332 may have different lengths. In some implementations, the contacts 332 have the same shape. For example, in some implementation, the contacts 332 may be generally rounded at one or both ends of the contact members. In other implementations, one or more of the contacts 332 may have different shapes. For example, in certain implementations, some of the contacts 332 are straight and some of the contacts 332 are generally L-shaped. In one example implementation, the L-shaped contacts may be longer than the rounded end contacts. In some implementations, the contacts 332 may be positioned in a staggered configuration. In other implementations, the contacts 332 may be laterally aligned.

As shown in FIGS. 4 and 5, the inner body 322 of the connector 320 may define a recessed section 326 in which the storage device 330 may be disposed. In some implementations, the cavity 326 faces away from the key 328 of the outer body 321. In another implementation, the cavity 326 may be provided on the same side as the key 328. In some implementations, the cavity 326 is formed at a front, center location of the connector 320. For example, the cavity 326 may open to a front side of the connector 320. In some such implementations, a front edge of the circuit board 331 may be disposed flush with a front edge of the inner body 322 when the storage device 330 is mounted at the cavity 326. In other implementations, the cavity 326 may be formed at a front location laterally offset from the center.

In the example shown, the cavity 326 is formed by a depression in a side of the inner body 322 (e.g., the side opposite the key 328). The depression is generally sized and configured to receive the printed circuit board 331 of the storage device 330. In some implementations, the cavity 326 has a stepped configuration to facilitate positioning of the storage device 330. For example, a well may be formed at one location in the depression. The well is sufficiently deep to accommodate an EEPROM circuit 333 coupled to one side of the circuit board 331. In some implementations, the depression may be sufficiently deep to enable electrical contacts 332 provided on the circuit board 331 to be generally flush with the outer surface of the inner body 322.

In other implementations, however, the depression is shallow so that a top of the printed circuit board 331 extends outwardly from the inner body 322. In such implementations, the outer body 321 may define a cut-out 327 that is sized to accommodate the storage device 330 (e.g., see FIGS. 4 and 5). The cut-out 327 aligns with the depression 326 in the inner body so that the cut-out 327 accommodates the storage device 330. For example, the cut-out 327 may be formed by removing a front, center portion of the outer body 321 to enable the storage device 330 to extend through the outer body 321. In certain implementations, the cut-out 327 extends sufficiently rearward to accommodate rearward movement of the storage device 330 relative to the outer body 321 (e.g., when the inner body 322 moves relative to the outer body 321).

Figure 3:
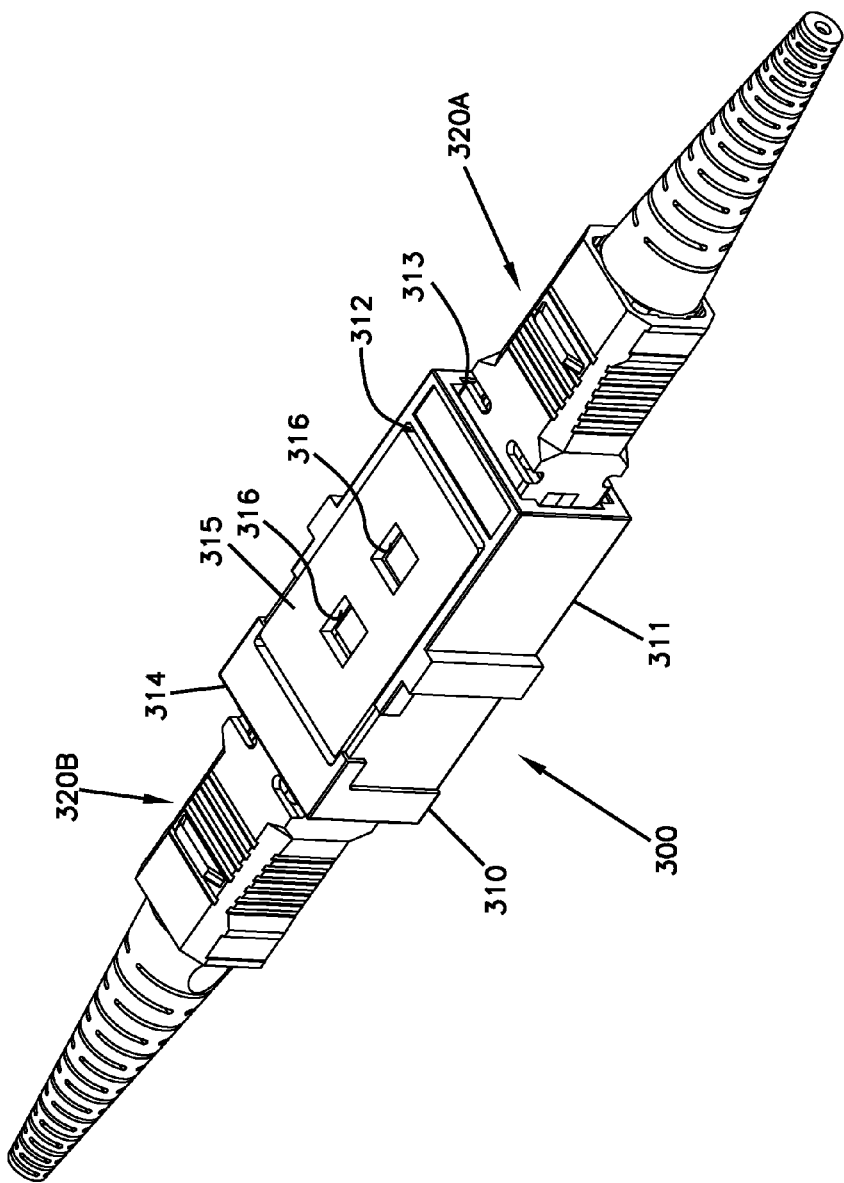
FIG. 3 illustrates a first example implementation of a connector system including a first example optical adapter and fiber optic connectors having PLI functionality as well as PLM functionality.
Figure 6:
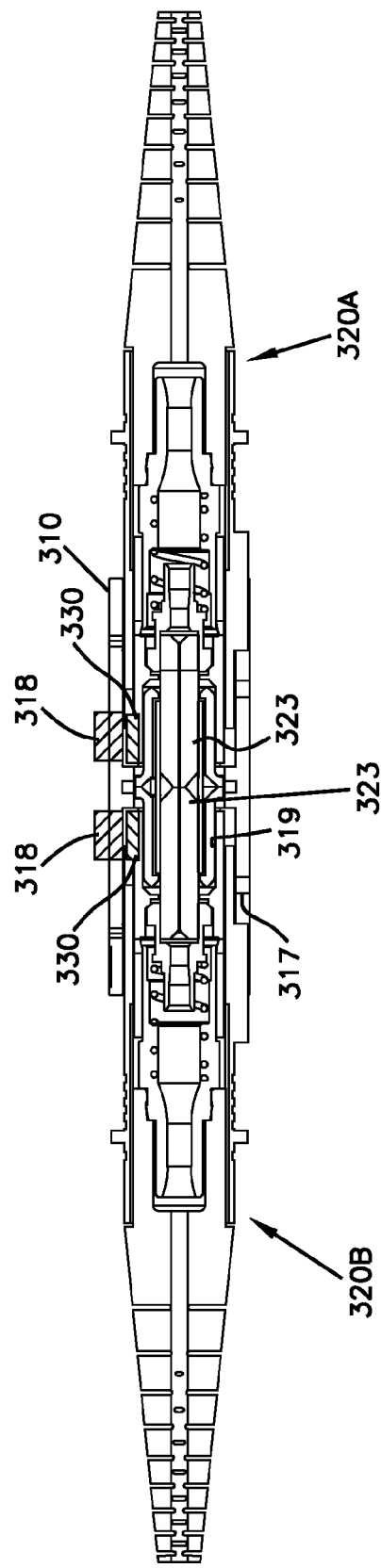
FIG. 6 is an axial cross-sectional view of the connector system of FIG. 3.

FIGS. 3 and 6 show one example implementation of a communications coupler assembly 310 implemented as a fiber optic adapter. The example communications coupler assembly 310 includes an adapter housing 311 defining one or more passages configured to align and interface two or more fiber optic connectors 320. In other example implementations, however, one or more passages can be configured to communicatively couple together a fiber optic connector 320 with a media converter (not shown) to convert the optical data signals into electrical data signals, wireless data signals, or other such data signals. In still other implementations, the communications coupler assembly 310 can include an electrical termination block that is configured to receive punch-down wires, electrical plugs (e.g., for electrical jacks), or other types of electrical connectors.

The example adapter housing 311 includes opposing side walls interconnected by at least one end wall. The side walls and end walls each extend between a front end and a rear end. The adapter housing 311 defines one or more axial passages extending between the front and rear ends. Each passage defines a first port 313 and a second port 314 at the front and rear ends, respectively. Each port 313, 314 is configured to receive a connector 320. In the example shown, the adapter housing 311 defines a single axial passage. In other implementations, however, the adapter housing 311 may define one, two, three, six, eight, ten, twelve, sixteen, or even more axial passages.

Sleeves (e.g., split sleeves) 319 may be positioned within the axial passages to receive and align the ferrules 323 of fiber optic connectors 320 (see FIG. 6). In some implementations, the sleeve 319 is monolithically formed with the adapter housing 311. For example, in some implementations, one of the end walls of the adapter housing 311 defines an opening 312 leading to the axial passage (see FIG. 3). The opening 312 in the end wall may enable an injection molding machine access to the axial passage to form the sleeve 319. A cover 315 may be coupled (e.g., latched, welded, fastened, adhered, etc.) to the adapter housing 311 to close the opening 312 and protect the interior of the adapter housing 311. In other implementations, the sleeve 319 is formed separately from the adapter housing 311 and subsequently inserted into the axial passage through the opening 312. In still other implementations, neither of the end walls defines an opening 312. Rather, the sleeve 319 may be inserted into the axial passage through one of the ports 313, 314.

One or more guides may be defined at an interior of adapter housing 311. The guides, which extend longitudinally along the interior corners of the axial passage, guide the fiber optic connector 320 through the port 313, 314. In certain embodiments, the guides may define ramped entry surfaces to facilitate insertion of the connector 320 within the adapter passage. One of the end walls of the adapter housing 311 defines at least one keyway 317 sized and shaped to receive a corresponding key 328 of the SC-type fiber optic connector 320 (see FIG. 6). In certain implementations, a keyway 317 is defined in the end wall at both ports 313, 314 (e.g., see FIG. 6).

In some implementations, flanges may extend outwardly from the side walls of the adapter housing 311 (see FIG. 3). The flanges aid in supporting the adapter housing 311 on or against a planar surface, such as that of a bulkhead. In some implementations, one or both side walls of the adapter housing 1210 also include a flexible cantilever arm defining outwardly protruding tabs that are configured to cooperate with the flanges to capture the adapter housing 311 against a bulkhead. In other implementations, the side walls of the adapter housing 311 define solid surfaces. In still other implementations, recesses may be provided in the side walls to permit the use of alternative fasteners, such as a flexible clip.

The coupler assembly 310 includes one or more media reading interfaces 318 (see FIG. 6). Each media reading interface 318 is configured to acquire the physical layer information from the storage device 330 of a fiber optic connector 320 plugged into the fiber optic adapter 310. For example, in one implementation, the adapter housing 310 can hold or retain a media reading interface 318 for each passage. In another implementation, the adapter housing 310 can hold or retain a media reading interface 318 for each port 313, 314 of each passage. For example, the adapter 310 shown in FIG. 6 includes a first media reading interface 318 associated with the front port 313 of the passage and a second media reading interface 318 associated with the rear port of the passage. In still other implementations, the adapter housing 310 can include a media reading interface 318 associated with each set of passages that accommodate a duplex connector arrangement 310. In other implementations, the adapter housing 310 can include any desired combination of front and rear media reading interfaces 318.

In certain implementations, the orientation of the first media reading interface 318 is flipped 180° from the orientation of the second media reading interface 318. In some implementations, the first media reading interface 318 is laterally offset from the second media reading interface 318. For example, the first and second media reading interfaces 318 may be positioned side-by-side. In other implementations, the first and second media reading interfaces 318 may be axially aligned. In some implementations, the first and second media reading interfaces 318 may be laterally aligned. In other implementations, the first media reading interfaces 318 may be offset towards the front of the adapter housing 310 and the second media reading interface 318 may be offset towards the rear of the adapter housing 310.

Figure 9:
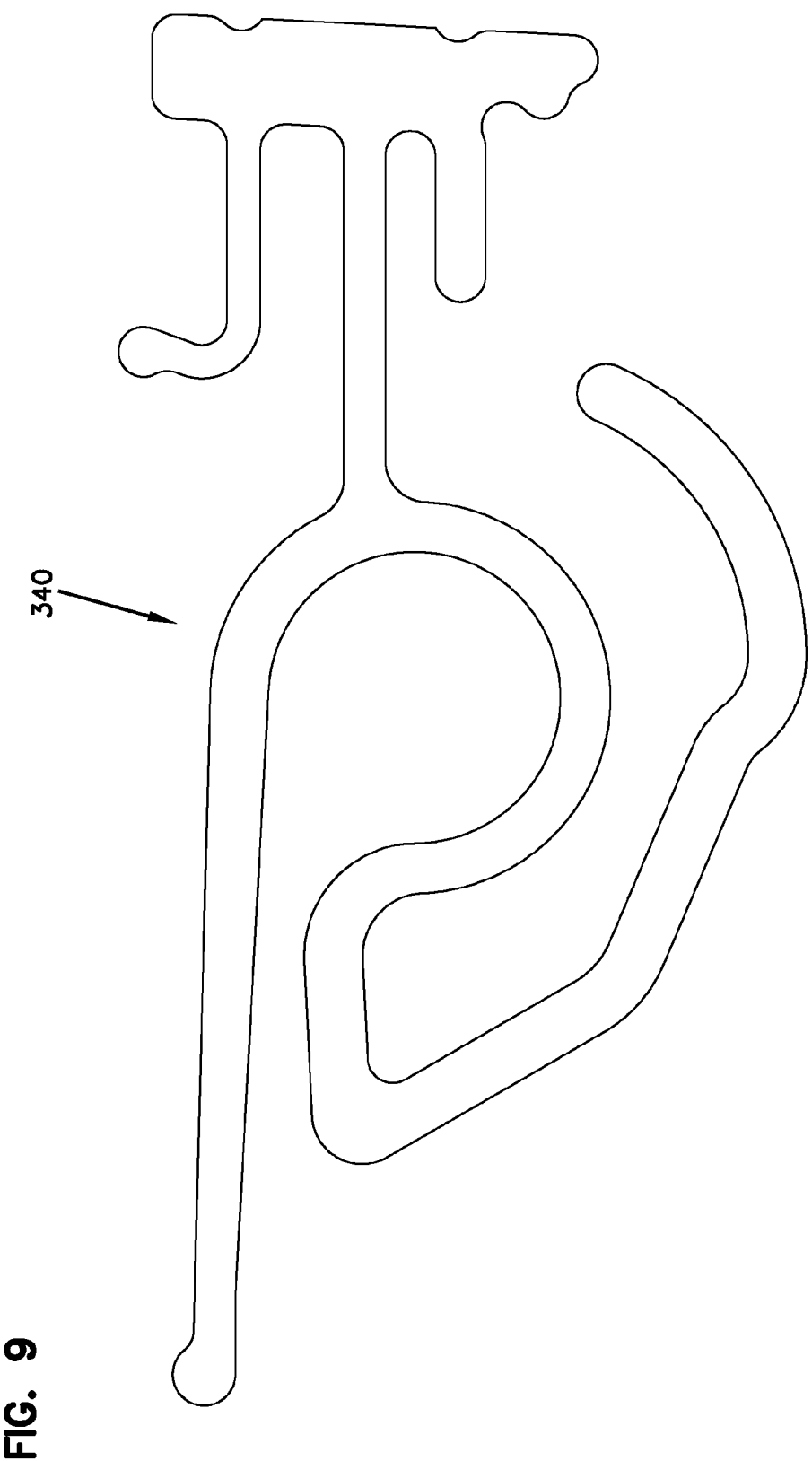
FIG. 9 illustrates one example contact member of a media reading interface suitable for use with any optical adapter disclosed herein.

In general, each media reading interface 318 is formed from one or more contact members 340 (FIG. 9). In some implementations, the media reading interface 318 includes at least a first contact member 340 that transfers power, at least a second contact member 340 that transfers data, and at least a third contact member 340 that provides grounding. In one implementation, the media reading interface 318 includes a fourth contact member 340. In other implementations, the media reading interface 318 include greater or fewer contact members 340.

In some implementations, the cover 315 defines slots 316 configured to receive one or more contact members 340. At least a portion of each slot 316 extends through the cover 315 to the axial passage of the adapter housing 311. In some implementations, the entirety of each slot 316 extends through the cover 315 from top to bottom. In other implementations, only portions of the slot 316 extend from the top to the bottom of the cover 315. For example, each slot 316 may define a recess in the top surface of the cover 315 in which the contact members can be positioned. Openings defined in a bottom of the cover 315 enable portions of the contact members 340 to extend into a respective adapter passageway.

The media reading interfaces 318 are positioned in the slots 316 of the cover 315 to connect a storage device 330 of a connector 3210 received at the adapter housing 310 with a circuit board coupled to the adapter housing 310. For example, a circuit board may be secured (e.g., via fasteners) to the adapter housing 310 so as to extend over the slots 316 of the cover 315. Each media reading interface 318 held by the cover 315 extends between the circuit board and a respective axial passage of the adapter housing 310. Portions of each contact member 340 engage tracings and contacts on the circuit board. Other portions of the contact members 340 engage the electrical contacts 332 of the storage members 330 attached to any connector 320 plugged into the adapter housing 310. The circuit board electrically connects to a data processor and/or to a network interface (e.g., the processor 217 and network interface 216 of FIG. 1). It is further to be understood that multiple adapter housings 310 can be connected to the printed circuit board within a connector assembly (e.g., a bladed panel). A processor coupled to the circuit board can access the memory 333 of each connector arrangement 320 coupled to the adapter housing 310 through corresponding ones of the contact members 340, 332.

In certain implementations, the slots 316 of the cover 315 are sized to hold individual contacts 340. The adapter housing 311 has internal structure that holds the contacts 340 in the slots 316. The slots 316 position the contact members 340 in alignment with the contact pads 332 of a connector storage device 330 mounted to a connector 320 received at the adapter housing 310. The slots 316 may be separated by intermediate walls to inhibit touching between adjacent contact members 340. In other implementations, all of the contact members 340 in a single media reading interface 318 may be retained in a single slot 316. In certain implementations, the slots 316 are sized to accommodate multiple contact members 340 mounted to a support body.

In some implementations, the contact members 340 of a single media reading interface 318 are positioned in a staggered configuration. For example, alternating ones of the contact members 340 are moved axially forward or axially rearward. In some implementations, the slots 316 accommodating the staggered contact members 340 also are staggered (e.g., in a front to rear direction). In other implementations, however, the slots 316 may have a common length. In still other implementations, the front and rear ends of the contact members 340 of a single media reading interface 318 are transversely aligned within similarly transversely aligned slots 316.

In some implementations, the cover 315 is sufficiently thick to enable the media reading interface contacts 340 to be substantially positioned in the cover 315. In some implementations, the material height of the cover 315 is at least 0.76 mm (0.03 inches). Indeed, in some implementations, the material height of the cover 315 is at least 1.02 mm (0.04 inches). In certain implementations, the material height of the cover 315 is at least 1.27 mm (0.05 inches). In some implementations, a height H1 (FIG. 27) of the adapter housing 310 is at least 9.4 mm. In certain implementations, the height H1 is at least 10 mm. Indeed, in certain implementations, the height H1 is at least 10 mm. In one example implementation, the height H1 is about 10.4 mm.

In other implementations, the slots 316 for accommodating the media reading interface 318 may be defined in the adapter housing 311 instead of in the cover 315. In certain implementations, the slots 316 may be defined in a side wall of the adapter housing 311 located opposite the cover 315. Alternatively, certain types of adapters 310 do not include a cover 315. Some such example implementations include a monolithic adapter housing. Other such example implementations include two-piece (e.g., front and rear) housings. In other implementations, the slots 316 may be defined in two or more side walls of the adapter housing 311.

One example type of contact member 340 is shown in FIG. 9. Each contact member 340 includes at least two moveable (e.g., flexible) contact sections defining contact surfaces. In certain implementations, one or more contact members 340 include three moveable (e.g., flexible) contact sections. The flexibility of the contact sections provides tolerance for differences in spacing between the contact member 340 and the adapter printed circuit board. Certain types of contact members 340 also include at least one stationary contact having a contact surface. For example, each contact member 340 may have two stationary contact sections. The ability of the first contact section to flex relative to the stationary contact provides tolerance for placement of the contact member 340 relative to the circuit board.

When the contact member 340 is mounted to the adapter 310, the first moveable contact section and the stationary contact sections extend through the adapter slot 316 to engage the adapter circuit board. The second moveable contact section is configured to extend into the axial passage of the adapter housing 310 and engage a connector 320 plugged into one of the ports 313, 314. If a storage device 330 is installed on the connector 320, then the second contact surface is configured to engage the contact pads 332 of the storage device 330.

In certain implementations, the third moveable contact section selectively extends through the slot 316 and engages the adapter circuit board. For example, the third contact section may be configured to engage the circuit board only when a connector 320 is plugged into the port 313, 314 corresponding with the contact member 340. The third contact section may be resiliently biased to extend within the adapter housing 310. For example, certain types of contact members 340 may include a resilient section that transfers force applied to second moveable contact section to the third moveable contact section. Accordingly, the resilient section may transfers a force pushing the second section towards the slot 316 to the third section, thereby pushing the third contact section through the slot 316 (e.g., toward the circuit board).

In certain implementations, a circumferential edge of each contact member 340 defines the contact surface of each contact section. In some implementations, the edge has a substantially continuous thickness. In various implementations, the thickness ranges from about 0.05 inches to about 0.005 inches. In some implementation, the thickness is less than about 0.012 inches. In one example implementation, the thickness is about 0.008 inches. In other implementations, the thickness may vary across the body of the contact member 340.

In one implementation, the contact member 340 is formed monolithically (e.g., from a continuous sheet of metal or other material). For example, in some implementations, the contact member 340 may be manufactured by cutting a planar sheet of metal or other material. In other implementations, the contact member 340 may be manufactured by etching a planar sheet of metal or other material. In other implementations, the contact member 340 may be manufactured by laser trimming a planar sheet of metal or other material. In still other implementations, the contact member 340 may be manufactured by stamping a planar sheet of metal or other material. In still other implementations, the contact member 340 may be formed from wire stock.

The contact member 340 shown and described herein is formed from a single piece. In other implementations, however, two or more separate pieces may operate together to perform the functions of the contact member 340. For example, a first piece may form the first moveable contact section and a second piece may form the third moveable contact section. Either of the pieces may form the second moveable contact section. Insertion of a connector 320 into a respective port of the adapter housing 310 may push one of the pieces into electrical contact with the other of the pieces to electrically connect the first and second contact sections.

When a connector 320 is fully inserted into the adapter housing 310 at one of the ports 313, 314, the connector ferrule 323 is received within one end of the ferrule sleeve 319 inside the adapter housing 310. In some implementations, the connector 320 may be releasably locked to the housing 310. For example, flexible latching hooks disposed within the interior of the housing 310 may engage the slots 329 defined in the outer body 321 of the connector 320 to releasably hold the connector 320 at the adapter port 313, 314. When the connector 320 includes a storage device 330, the contacts 332 of the storage device 330 are configured to align with the slots 316 defined in the adapter housing 310. Accordingly, the media reading interface contact members 340 held within the slots 316 align with the contacts 332 of the connector storage device 330 to establish an electrical connection between the storage device 330 and the adapter circuit board.

In accordance with some aspects, each media reading interface 318 of the adapter 310 is configured to detect the presence of a connector arrangement 320 plugged into a port 313, 314 of the adapter housing 310. For example, the contact members 340 of a media reading interface 318 can function as presence detection sensors or trigger switches. In some implementations, the contact members 340 of a media reading interface 318 are configured to form a complete circuit with the adapter circuit board only when a connector 320 is plugged into a respective port 313, 314. For example, each contact member 340 may contact the circuit board only after being pushed toward the circuit board by a connector 320 received at the adapter 310. In other example implementations, the connector 320 may push the contact members 340 away from the circuit board or from a shorting rod. In accordance with other aspects, however, certain types of contact members 340 may form a complete circuit with the circuit board regardless of whether a connector 320 is received at the adapter 310.

As discussed above, a processor (e.g., processor 217 of FIG. 2) or other such equipment also can be electrically coupled to the printed circuit board. Accordingly, the processor can communicate with the memory circuitry 333 on the connector storage device 330 via the contact members 340 and the printed circuit board. In accordance with some aspects, the processor is configured to obtain physical layer information from the connector storage device 330. In accordance with other aspects, the processor is configured to write physical layer information to the connector storage device 330. In accordance with other aspects, the processor is configured to delete physical layer information from the connector storage device 330. In still other implementations, the processor detects the presence or absence of a connector 320 at each port 313, 314.

When removing the fiber optic connector 320, the slidable outer body 321 of the connector 320 is slid axially relative to the inner body 322 away from the adapter housing 310 until the flexible latching hooks of the adapter housing 310 are released from the slots 329 defined on the outer body 321 of the connector 320. When released, the connector 320 may be slide rearwardly through the port 313, 314 to remove the connector 320 from the adapter housing 310.

Removing the connector 320 from the port 313, 314 releases the second moveable contact portion of the contact member 340, thereby allowing the third moveable contact portion to move back to the initial position. Dropping the third moveable contact portion disengages the third contact surface from the circuit board, thereby interrupting the circuit created by the contact member 340. Interrupting the circuit enables a processor connected to the circuit board to determine that the connector 320 has been removed from the port 313, 314. In some implementations, the storage device 330 is not moved out of alignment with the media reading interface 318 until the connector 320 is released. In other implementations, however, moving the outer body 321 rearwardly applies sufficient force to the inner body 322 to move the storage device 330 out of alignment with the media reading interface 318.

Figure 10:
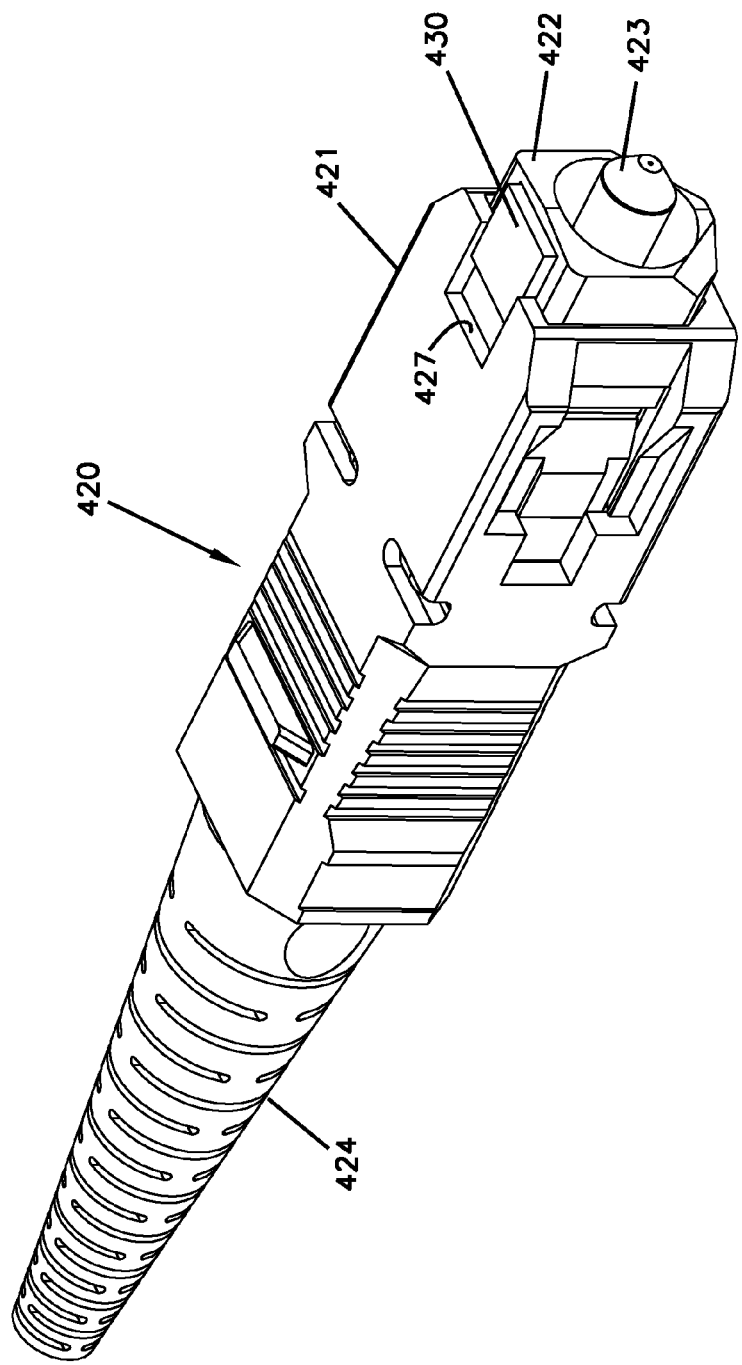
FIG. 10 illustrates a second example implementation of an SC-type optical connector suitable for use in a system having PLI functionality as well as PLM functionality.
Figure 11:
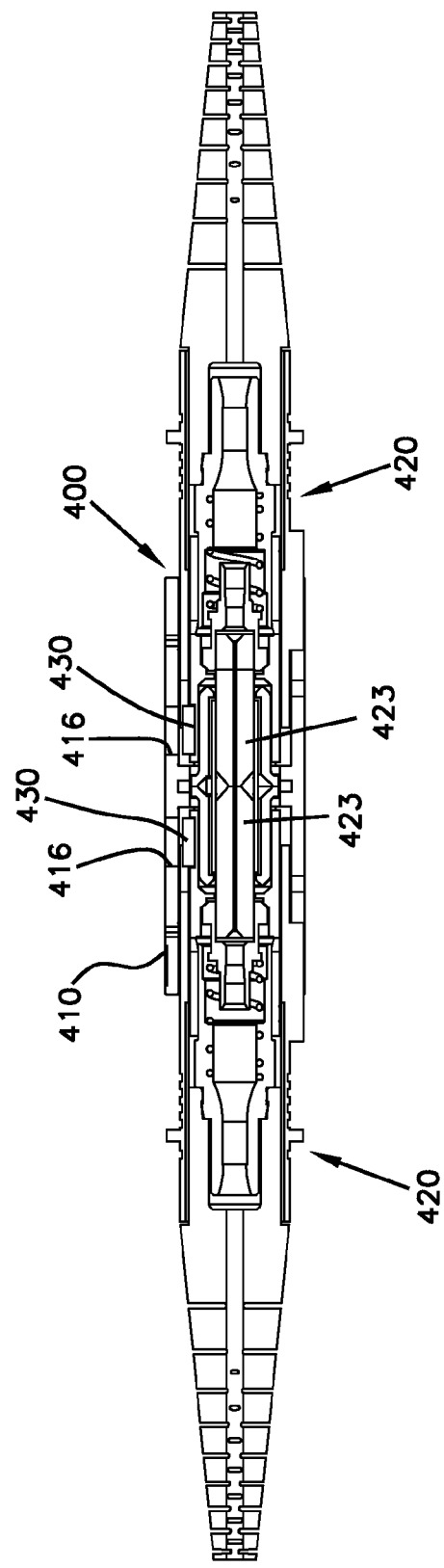
FIG. 11 is an axial cross-sectional view of another example implementation of an SC-type adapter receiving two of the SC connectors of FIG. 10.

FIGS. 10 and 11 illustrate another example implementation of a connector system 400 (FIG. 11) that can be utilized on a connector assembly (e.g., a communications panel) having PLI functionality as well as PLM functionality. The connector system 400 includes at least one example optical adapter 410 and at least two optical connector arrangements 420. The optical connector 420 shown is an SC-type optical connector having an outer body 421 that is axially moveable relative to an inner body 422. The inner body 422 holds a ferrule 423 through which at least one optical fiber extends. The optical connector 420 shown in FIGS. 10-12 is substantially the same as the optical connector 320 disclosed above, except for certain features discussed below.

As shown in FIGS. 10 and 11, a storage device 430 is coupled to the connector 420 at a recessed portion 426 of the inner body 422. However, the location on the inner body 422 at which the storage device 430 is disposed is rearwardly offset compared to the location of the storage device 330 on the inner body 322 of the optical connector 320 disclosed above. For example, a front edge of the storage device 430 is rearwardly offset from the front edge of the inner body 422. In certain implementations, the recess does not extend sufficiently forward to open through the front edge of the inner body 422.

The optical adapter 410 shown in FIG. 11 is substantially the same as the optical adapter 310 disclosed above, except for certain features discussed below. The axial positioning of the storage device 330, 430 on the inner body 322, 422 of the connector 320, 420 determines or is influenced by the axial positioning of the media reading interfaces 318 in the adapter 310, 410. Accordingly, the slots 416 defined in the adapter 410 shown in FIG. 11 are spaced farther apart in the axial direction as compared to the slots 316 of the adapter 320 shown in FIG. 3.

Figure 12:
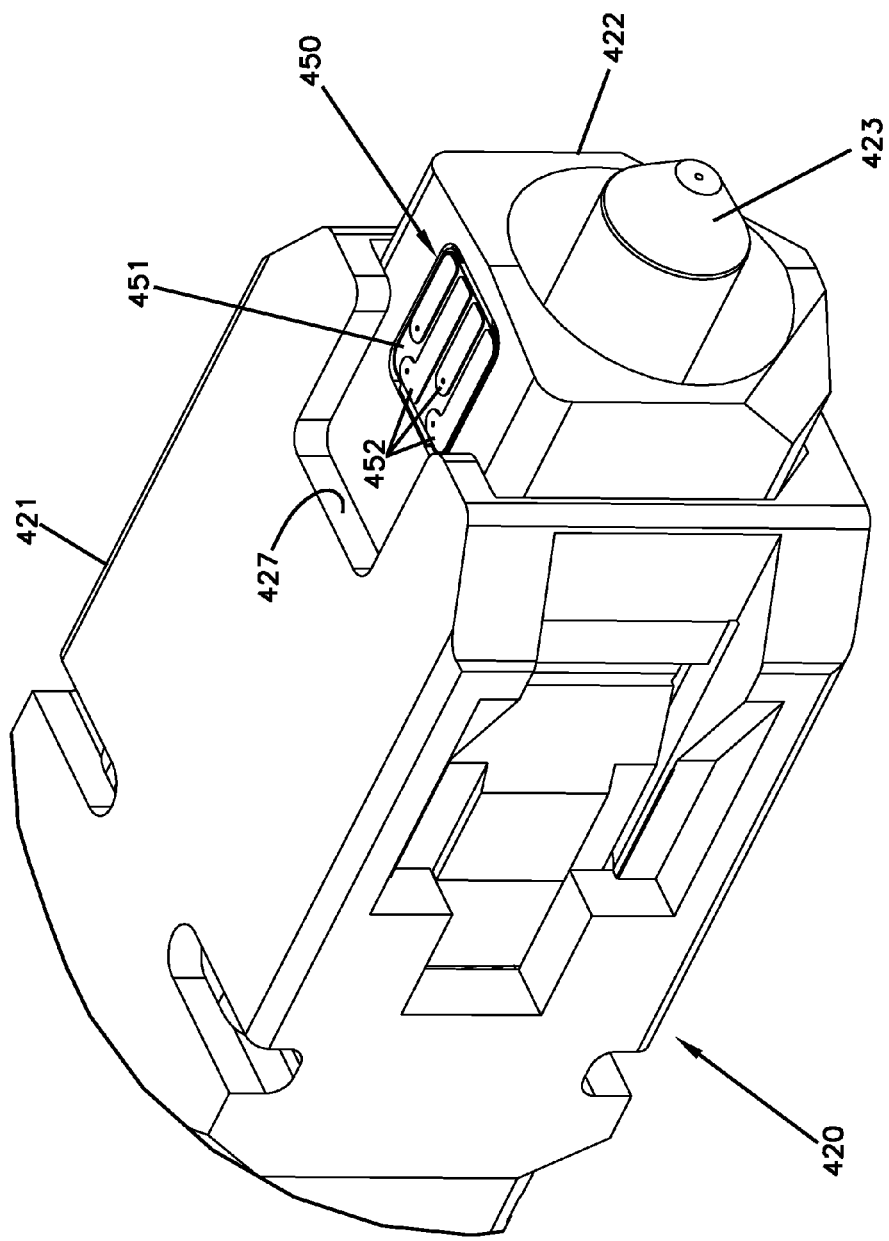
FIG. 12 is an enlarged view of the front of the SC optical connector shown in FIG. 10 with another example storage device mounted thereto.

FIG. 12 illustrates another example storage device 450 disposed on the optical connector 420 of FIG. 10. The storage device 450 is offset rearwardly from a front of the inner body 422 of the connector 420. In the example shown, the storage device 450 includes contacts 452 disposed on one side of a printed circuit board 451. In certain implementations, the memory (e.g., EEPROM) is disposed at an opposite side of the circuit board 451. In other implementations, the memory can be disposed on the same side of the circuit board 451 as the contacts 452.

In certain implementations, the contacts 452 are uniformly disposed on the board 451. In the example shown in FIG. 12, however, two of the contacts are shorter than another two of the contacts. Also in the example shown, two of the contacts are L-shaped and two of the contacts extend in a straight line. In other implementations, however, other types of contacts 452 may be disposed on the circuit board 451. For example, square contacts may be arranged in a grid pattern.

The embodiments described above make use of a contact-based interface for reading from and/or writing information to a storage device 330 attached to the connector 320, 420. In accordance with other aspects of the disclosure, however, contact-less or wireless interfaces also can be used with the optical systems described above. In some such alternative embodiments, RFID technology is used. In one such RFID embodiment, the storage device 330, 430 attached to the connector 320, 420 is implemented as an RFID tag. In such an embodiment, the storage device 330 does not include an EEPROM 333 and contacts 332. Rather, the RFID tag includes memory and an antenna.

Also, in such an embodiment, the adapter contacts 340 of the media reading interfaces 318, 418 are replaced with an RFID coil or antenna. The RFID coils in the adapter ports are connected to one or more RFID readers (using a suitable multiplexing mechanism if needed). In order to read information from an RFID tag, the RFID reader outputs an RF interrogation signal via the RFID coil associated with the appropriate adapter port. For example, the RFID reader may output such an RF interrogation signal in response to an optical connector 320, 420 being inserted into the adapter port 313, 314, 413, 414.

The RFID tag on the optical connector receives the RFID interrogation signal, which causes the RFID tag to power on, to retrieve information (e.g., physical layer information) stored in the RFID tag, and to transmit the read information. The transmission from the RFID tag is received by the RFID reader using the RFID coil in the adapter port. The information included in such transmissions can be provided to a controller included in the patch panel or other optical system associated with the adapter 310, 410. The information also can be communicated to the aggregation point 220 in an IP network 218 as described above. Other contact-less or wireless embodiments can be implemented in other ways.

Figure 13:
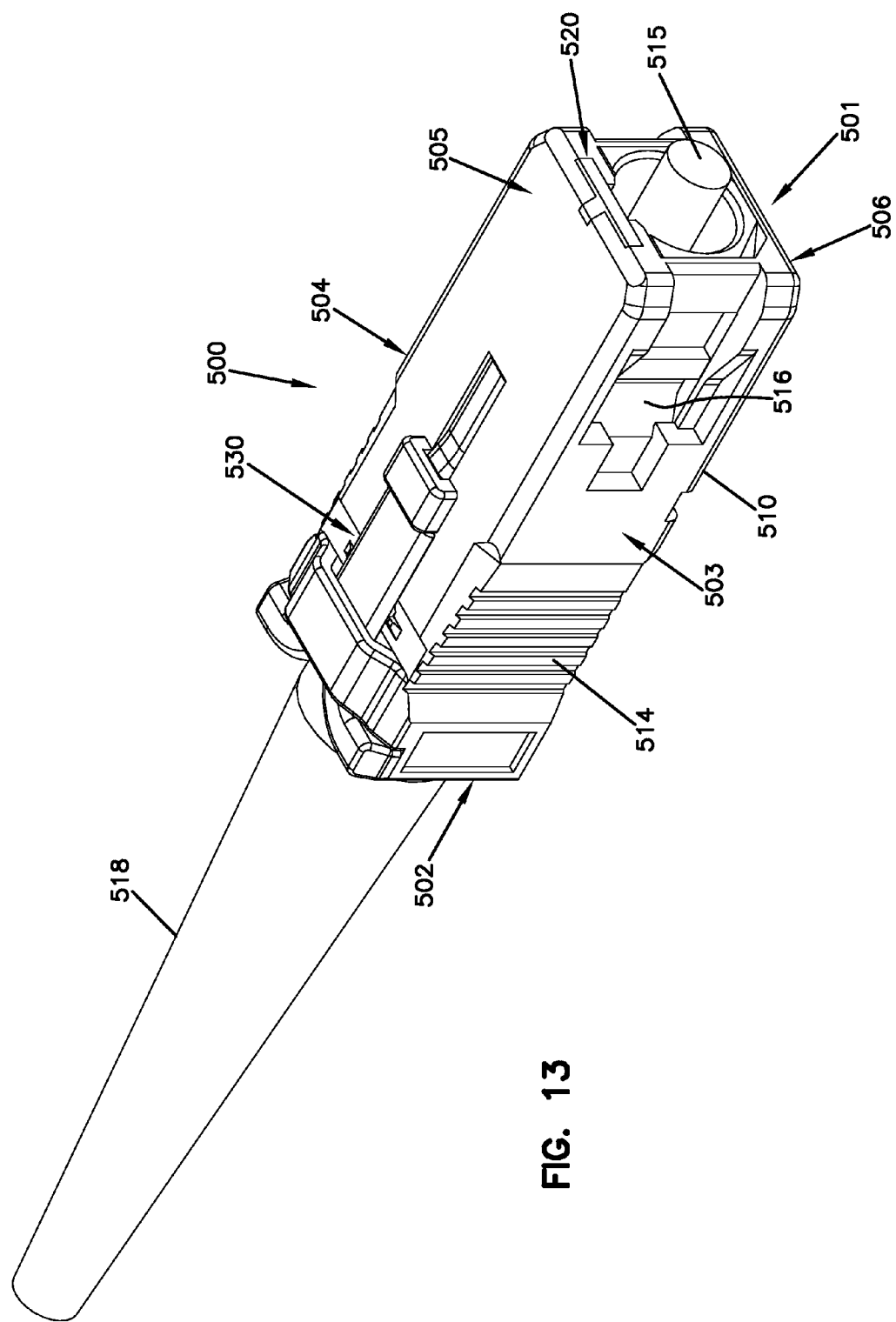
FIG. 13 is a front perspective view of an example SC optical connector including an embedded storage device.
Figure 14:
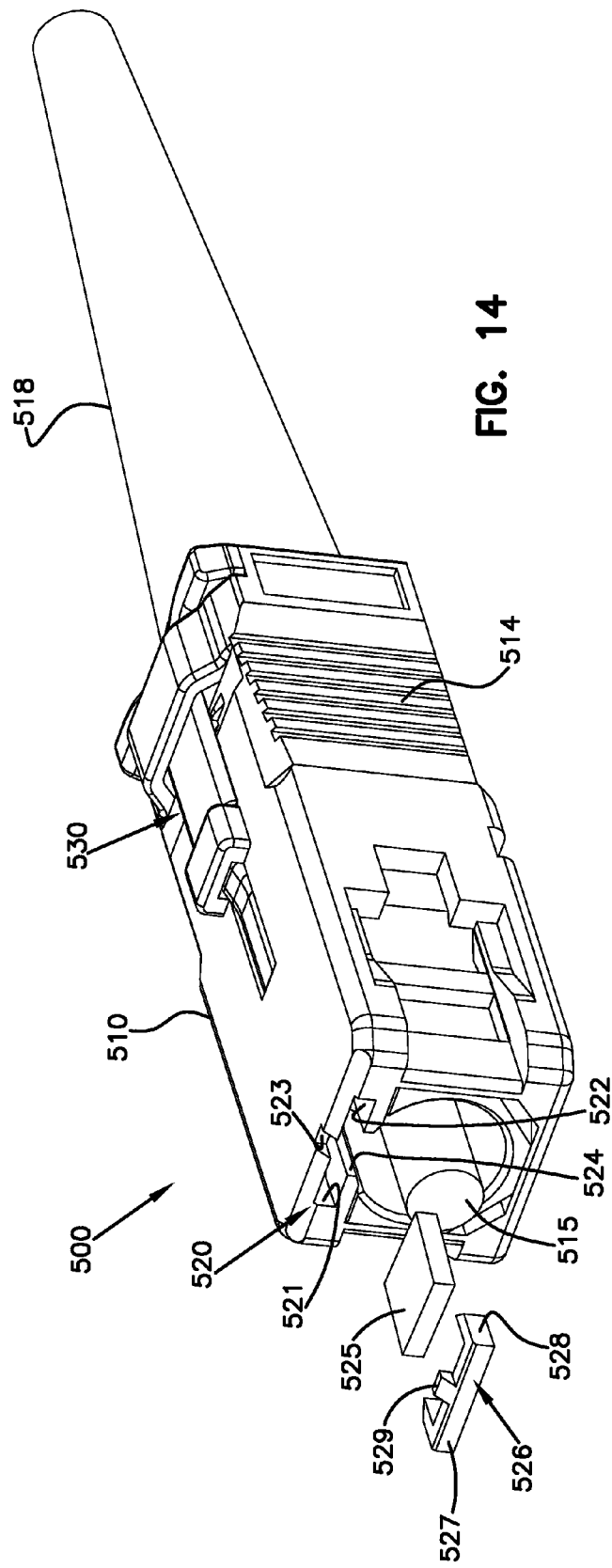
FIG. 14 shows the storage device and a cover exploded from the SC optical connector of FIG. 13.
Figure 15:
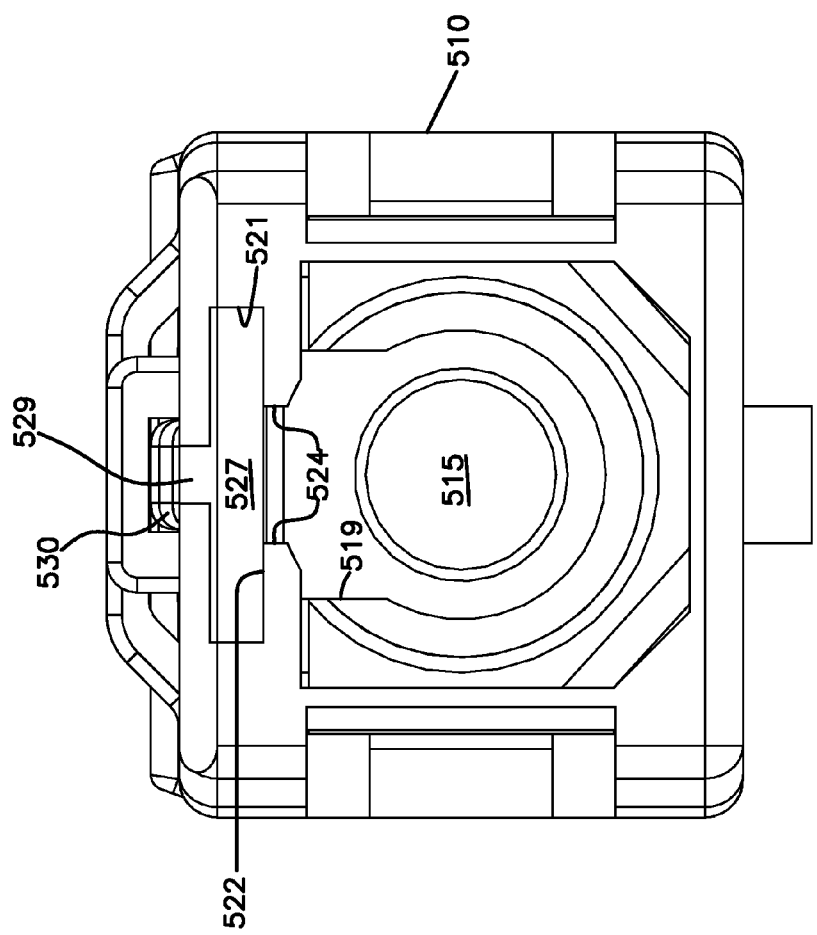
FIG. 15 is a front end view of the SC-type optical connector of FIG. 13.

FIGS. 13-15 illustrate another example optical connector 500 having a storage device 525. The optical connector 500 has a front 501, a rear 502, a first side 503, a second side 504, a top 505, and a bottom 506. The connector 500 includes an outer body 510 defining grip surfaces 514 and a connection mechanism 516. For example, a grip surface 514 and a connection component can be formed on each side 503, 504 of the outer body 510. An inner body is configured to move (e.g., slide) relative to the outer body 510. An optical fiber tip is held at the inner body and accessible from the front 501 of the connector 500 (e.g., via a ferrule). In the example shown, a dust cap 515 covers the optical fiber tip. A strain-relief boot 518 can extend rearwardly from the outer body 510.

In some implementations, the storage device 525 is disposed internally within the connector body 510. For example, the connector body 510 can define a storage compartment 520 to hold the storage device 525. As shown in FIG. 14, the storage compartment 520 includes a cavity 521 extending into the connector body 510 from the front 501. In an example, the cavity 521 is defined in the connector body 510 between the top 505 of the body 510 and the internal passage in which the optical fiber is disposed. The connector body 510 forms shelves 522 that partially define the cavity 521. A notch 523 can be provided in the connector body 510 at the front 501 to be continuous with the cavity 521.

In certain implementations, the shelves 522 are separated by a gap 524 (see FIG. 15). The inner body also defines a gap 519. The gaps 519, 524 provide sufficient room to inhibit interference between the shelves 522 and other components. In some implementations, the gaps 519, 524 enable components within an optical adapter to fit with the connector 500. For example, in certain implementations, the gaps 519, 524 provide sufficient room for a split sleeve or other structure disposed within an optical adapter to surround the optical tip of the connector 500 when the connector 500 is received at a port of the optical adapter. In other implementations, the gaps 519, 524 provide sufficient room for a dust cap to be mounted over the optical tip.

The storage device 525 is configured to be advanced into the cavity 521 from the front 501 of the connector 500 (see FIG. 14). For example, the storage device 525 can be slid edge-wise into the cavity 521 along the shelves 522. A plug piece 526 can be coupled to the connector body 510 to close the storage device 525 within the cavity 521. For example, the plug piece 526 can be welded, glued, overmolded, or otherwise secured to the body 510. The plug piece 526 includes a front member 527 that extends across the opening to the cavity 521, two arms 528 extending rearwardly from the front member 527, and a lug 529 that extends outwardly from the front member 527. The arms 528 are sized and configured to slide into the cavity 521 on opposite sides of the storage device 525. The lug 529 is sized and configured to fit within the notch 523. In an example, the storage device 525 can be glued into position within the cavity 525. In another example, the storage device 525 can be held into position using a vacuum until the plug piece 526 is added.

In some implementations, the storage device 525 includes an RFID tag. In such implementations, the storage device 525 can be fully sealed within the connector body 510. In other implementations, the storage device 525 includes a circuit board including memory and contact pads. In such implementations, openings are defined in the top 505 of the connector body 500 to provide access to the contact pads.

In other implementations, a cavity can be defined in the top surface 505 of the connector body 510. The storage device 525 can be disposed within the cavity. A cover can be added to close the cavity. In an example, the storage device 525 can be glued into position within the cavity. In another example, the storage device 525 can be held into position using a vacuum until a cover is added. For example, the cavity section of the connector body 510 and storage device 525 can be overmolded (e.g., using injection molded plastic) to close the cavity. In certain implementations, the storage device 525 includes an RFID tag that can be sealed within the cavity by the cover. In other implementations, the storage device 525 can include a circuit board including memory and contact pads. In such implementations, the contact pads are left accessible through the cover. For example, the contact pads can be pressed against the mold during an overmolding process to prevent the contact pads from being overmolded.

Figure 16:
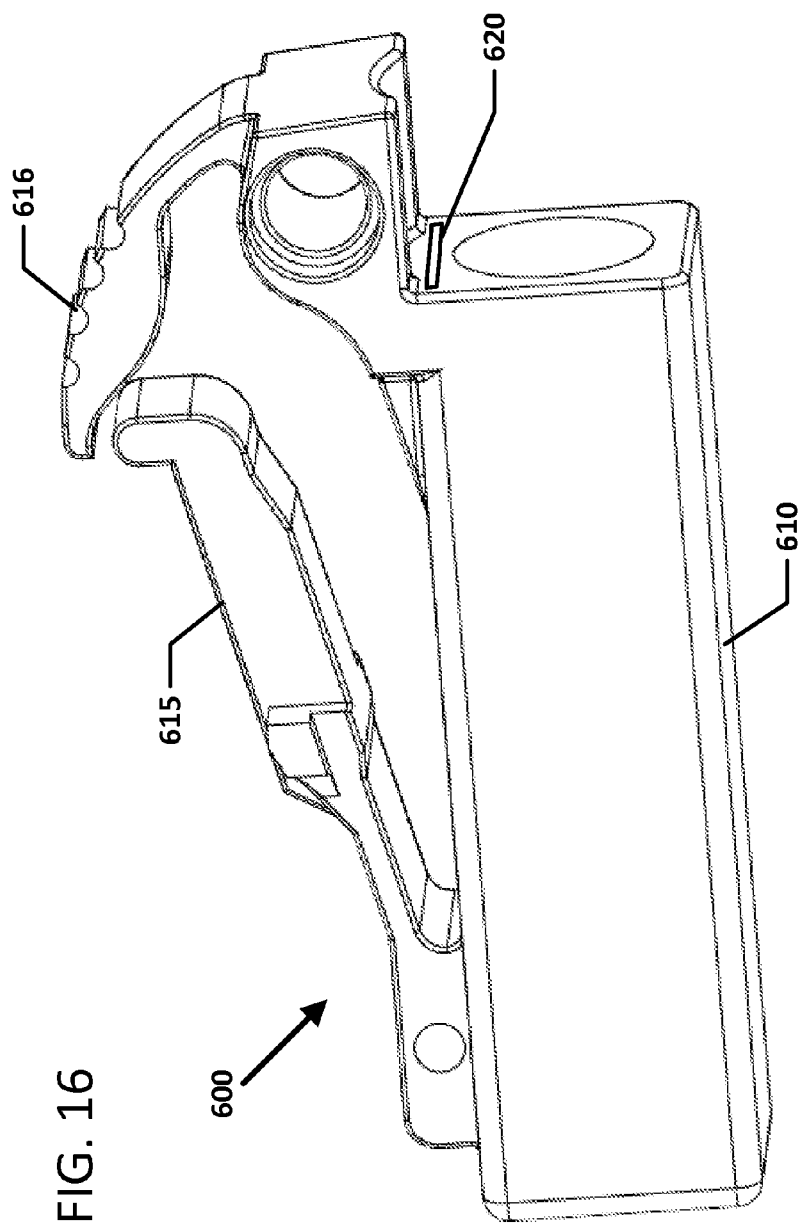
FIG. 16 is a rear perspective view of an example LC connector having a rear slot for receiving a memory storage device.
Figure 17:
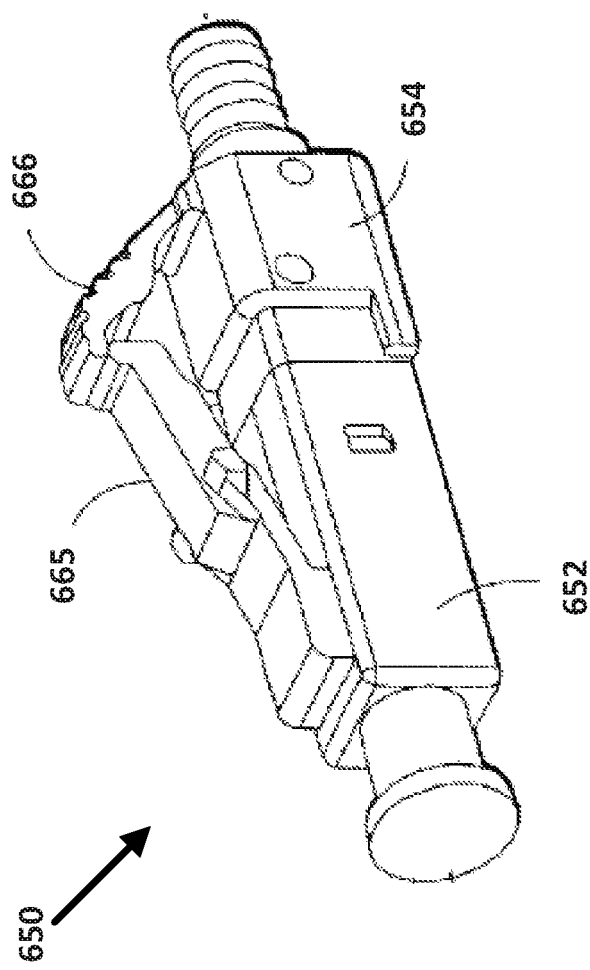
FIG. 17 is a front perspective view of another example LC connector having a rear slot for receiving a memory storage device.

FIGS. 16 and 17 illustrate various example LC connectors 600, 650 having rear slots sized and configured to hold a storage device (e.g., an RFID tag, a circuit board and EEPROM, etc.). For example, the LC connector 600 includes a single-piece body 610 including a latch 615 for securing the connector 600 to an adapter. The body 610 also includes a trigger 616 to facilitate depression of the latch 615. A distal tip of an optical fiber protrudes from a front of the body 610 and an optical cable extends from a rear of the body 610. A strain-relief boot can be mounted to the rear of the body 610. The body 610 defines a slot 620 leading to a cavity defined in the body 610 of the connector 600. In an example, the cavity opens into a longitudinal bore extending through the connector body 610. In another example, the cavity is separate from the bore. A storage device can be inserted edge-wise within the cavity and the slot 620 can be closed. In an example, the slot 620 can be overmolded shut. In another example, a plug can be inserted into the slot 620. In another example, the boot can cover the slot 620.

FIG. 17 shows an LC connector 650 having a two-piece housing including a front housing piece 652 and a rear housing piece 654. The front housing piece 652 includes a latch 665 and the rear housing piece 654 includes a trigger 666. In some implementations, a slot (e.g., slot 620) can be defined in the rear housing piece 654. The slot leads to a cavity in the rear housing piece 654. The storage device can be inserted edge-wise within the cavity and the slot can be sealed to close the storage device within the cavity. In an example, the slot can be overmolded shut. In another example, a plug can be inserted into the slot. In another example, the boot can cover the slot.

The above specification, examples and data provide a complete description of the manufacture and use of the composition of the invention. Since many implementations can be made without departing from the spirit and scope of the invention, the invention resides in the claims hereinafter appended.

What is claimed is:

1. A fiber optic connector configured to be received at an optical adapter, the fiber optic connector comprising:
    a body configured to surround an optical fiber that extends longitudinally through the body, the body having a cavity accessible through a slot defined in the body, the body including shelves that at least partially define the cavity; and
    an RFID tag sealed within the cavity defined in the body, the RFID tag including a transmission member for communicating information from memory to a data management system;
    wherein the slot is sized to receive the RFID tag edgewise, and the RFID tag is seated on the shelves in the cavity.

2. The fiber optic connector of claim 1, wherein the slot opens from a front of the body.

3. The fiber optic connector of claim 1, wherein the slot opens from a rear of the body.

4. The fiber optic connector of claim 1, wherein the body includes an outer body slidable relative to an inner body, the inner body holding the optical fiber and the outer body defining a gripping portion.

5. The fiber optic connector of claim 4, wherein the fiber optic connector includes an SC connector.

6. The fiber optic connector of claim 1, wherein the optical fiber is disposed in a ferrule coupled to the body.

7. The fiber optic connector of claim 1, further comprising a plug piece coupled to the body to close the RFID tag within the cavity.

8. The fiber optic connector of claim 7, wherein the plug piece is welded to the body.

9. The fiber optic connector of claim 7, wherein the plug piece is glued to the body.

10. The fiber optic connector of claim 7, wherein the plug piece is overmolded to the body.

11. The fiber optic connector of claim 1, wherein the body includes an outer body slidable relative to an inner body, the inner body defining a longitudinally extending gap that aligns with a gap between the shelves.

12. The fiber optic connector of claim 1, wherein the body includes a latch for securing the fiber optic connector to an adapter.

13. The fiber optic connector of claim 12, wherein the fiber optic connector includes an LC connector.

14. The fiber optic connector of claim 12, wherein the body includes a front housing piece and a rear housing piece, the front housing piece including the latch and the rear housing piece defining the slot.

15. The fiber optic connector of claim 1, wherein the slot is overmolded shut.

16. The fiber optic connector of claim 1, wherein a boot is mounted to the body to cover the slot.

17. The fiber optic connector of claim 1, wherein the body is a single-piece body.

* * * * *